United States Patent
Matheisl et al.

(10) Patent No.: US 9,016,922 B2
(45) Date of Patent: Apr. 28, 2015

(54) ILLUMINABLE TRANSPARENT PANEL

(71) Applicant: Inventio AG, Hergiswil (CH)

(72) Inventors: Michael Matheisl, Vosendorf (AT);
Gunther Niedermayer, Vienna (AT)

(73) Assignee: Inventio AG, Hergiswil (CH)

( * ) Notice: Subject to any disclaimer, the term of this patent is extended or adjusted under 35 U.S.C. 154(b) by 36 days.

(21) Appl. No.: 13/858,332

(22) Filed: Apr. 8, 2013

(65) Prior Publication Data
US 2013/0279201 A1 Oct. 24, 2013

(30) Foreign Application Priority Data
Apr. 18, 2012 (EP) .................................. 12164546

(51) Int. Cl.
*F21V 7/04* (2006.01)
*F21V 8/00* (2006.01)
*B66B 23/22* (2006.01)

(52) U.S. Cl.
CPC .............. *G02B 6/0011* (2013.01); *B66B 23/22* (2013.01); *B66B 23/225* (2013.01)

(58) Field of Classification Search
CPC ..... B66B 23/22; B66B 23/225; G02B 6/0011
USPC ............... 362/615, 616, 511, 602, 97.1, 97.2, 362/97.3, 97.4; 187/391, 394, 399
See application file for complete search history.

(56) References Cited

U.S. PATENT DOCUMENTS

| | | | | |
|---|---|---|---|---|
| 5,681,666 A | * | 10/1997 | Treger et al. | ..................... 429/90 |
| 2009/0120730 A1 | * | 5/2009 | Begle | ............................. 187/399 |
| 2013/0279196 A1 | * | 10/2013 | Greener et al. | ............... 362/613 |

FOREIGN PATENT DOCUMENTS

| | | | |
|---|---|---|---|
| DE | 42 26 883 A1 | | 3/1993 |
| EP | 2110238 A1 | * | 10/2009 |
| JP | 2000 263699 A | | 9/2000 |

OTHER PUBLICATIONS

English machine translation of EP2110238A1 Oct. 2009.*

* cited by examiner

*Primary Examiner* — Anh Mai
*Assistant Examiner* — Glenn Zimmerman
(74) *Attorney, Agent, or Firm* — Ladas & Parry LLP (57) ABSTRACT

An escalator, a moving walkway or an elevator cage includes at least one illuminable transparent panel. The illuminable transparent panel has a construction containing a plurality of layers. The two side surfaces of each layer are bounded in the area dimension thereof by an edge region. The layers of the construction are arranged with the side surfaces against one another. The layer sequence of the construction is defined, wherein a first layer is a first glass pane, a second layer is a first transparent polymer layer, a third layer is a second glass pane, a fourth layer is a transparent polymer material plate containing light-dispersing particles, a fifth layer is a third glass pane, a sixth layer is a second transparent polymer layer and a seventh layer is a fourth glass pane.

17 Claims, 5 Drawing Sheets

ILLUMINABLE TRANSPARENT PANEL

CROSS-REFERENCE TO RELATED APPLICATION

This application claims priority to European Patent Application No. 12164546.9, filed Apr. 18, 2012, which is incorporated herein by reference.

FIELD

The disclosure relates to an illuminable transparent panel for an escalator, a moving walkway or an elevator cage.

BACKGROUND

Elevators are used not only the private sector, but also in the public sector. A pleasant, sufficiently bright lighting and a decorative interior furnishing can influence the mood of the user in the elevator cage. Elevator cages are also often provided with transparent walls which make it possible for the users to see the surroundings from the elevator cage.

Escalators and moving walkways are used almost exclusively in the public sector, for example in department stores, shopping centers as well as in larger hotels. They generally comprise a support structure and at least one plate belt or step belt, which is arranged in the support structure and movable in its longitudinal direction and with which lateral stationary balustrades are connected. The balustrades often have transparent panels which are fastened to the support structure by means of a balustrade base. Balustrades with transparent panels are usually termed glass balustrades. A handrail moving with the plate belt or step belt can be arranged above each balustrade. In order to make possible a view of interesting technical aspects of an escalator or moving walkway the framework structures are sometimes also clad with transparent panels.

Escalators and moving walkways often have lighting systems which increase the comfort of the users and contribute to avoidance of accidents. Some lighting systems for moving walkway and escalator installations are designed so that only certain regions of the moving walkway or escalator installations are lit. These regions are located between the balustrades. For example, only an upper region with the handrail, a lower region in which the balustrades and the plate belt or step belt impinge or those regions by way of which the moving walkway or escalator installations are entered or left are lit.

SUMMARY

At least some of the disclosed embodiments create an illuminable transparent panel for a moving walkway, an escalator or an elevator cage, which has a uniformly lit surface and a compact construction as well as is economic in manufacture and maintenance.

Some embodiments comprise an illuminable transparent panel which can be illuminated by at least one light source. The light source is arranged at at least one edge region of the illuminable transparent panel. The illuminable transparent panel is has a construction containing a plurality of layers. The two mutually opposite side surfaces of each layer on the layer itself is or are bounded in terms of area thereof by an edge region. The layers of the construction are arranged one against the other by their side surfaces, i.e. the layers are layered one on the other by the side surfaces thereof in order to obtain the desired construction. The layer sequence of the construction is defined, wherein a first layer is a first glass pane, a second layer is a first transparent polymer layer, a third layer is a second glass pane, a fourth layer is a transparent edge-illuminable polymer material plate containing light-dispersing particles, a fifth layer is a third glass pane, a sixth layer is a second transparent polymer layer and a seventh layer is a fourth glass pane.

Obviously the light-emitting transparent panels also have further transparent layers between the layers described in the foregoing. The enlarged layer sequence of this illuminable transparent panel corresponds—notwithstanding the additional layers—with the construction described in the foregoing. Each additional layer, however, reduces the light output and the transparency (permeability by electromagnetic waves of visible light) of the illuminable transparent panel.

So that the transparent panel can deliver the light, which is supplied to the edge region, uniformly over the side surface bounded in the area extent thereof by the edge region a special optical conductor is used. For some time, transparent polymer material plates, which can be lit at the edges, of polymethylmethacrylate (PMMA) having additional transparent light-dispersing particles have been available in the trade. These polymer material plates have the desired optical conducting property by virtue of the embedded light-dispersing particles. They are edge-lit and uniformly distribute light, which is fed thereto in the edge region, over the side surfaces, which are bounded in the area dimension thereof by the edge region, of the polymer material plate. The entry area of the light is possibly arranged orthogonally to the exit area of the light so as to avoid light concentrations at the side surface. By virtue of these characteristics, an illuminable panel can be constructed very economically and simply. In addition, the light source can be arranged laterally of the polymer material plate, which can simplify maintenance thereof and lead to a very compact construction of the illuminable panel.

These polymer material plates irradiate uniformly by way of both side surfaces. The irradiating side surface can additionally be covered by an information carrier, for example a motif film, and have a protective covering, for example of scratch-proof glass.

The use of the afore-described optical conductor for edge-illuminable transparent panels can, however, conceal the disadvantages mentioned in the following, which do not lead to the desired characteristics of the illuminable panel. The coverings or the information carriers may not, according to manufacturer instructions, be glued or laminated over the whole area to the polymer material plate, since in the case of optical contact disruptive brightened areas and darkened areas would be created. In the case of construction from edge-illuminable panels with the afore-described polymer material plates, an appropriate spacing between the individual layers therefore should be observed so that they are not arranged against one another.

The spacing of the individual layers leads to thick panels which, used as lateral cladding, substantially increase the width of the escalator, the moving walkway or the elevator cage and, used as a glass balustrade, impart a clumsy, unaesthetic impression. In addition, due to the spacing of the layers in the panel chambers are created in which condensation water can form.

Vibrations caused by the users of an escalator, a moving walkway or an elevator could in addition lead to temporary optical contacts. Due to the temporary optical contacts, moving bright areas and dark areas are produced which could lead to insecurity of users and deter them from using the escalator, moving walkway or elevator.

Although the side surfaces of the polymer material plates are provided by manufacturers with protective films, these can after transport, storage or cutting to size nevertheless have scratches. Without edge illumination these are often barely recognizable just by the eye, but the light issuing from the surface is focused very strongly and disrupts the optical impression of the illuminated panel.

The aforesaid disadvantages can mean that the polymer material plates, which can be lit at the edges, with light-dispersing particles previously did not necessarily appear suitable for producing edge-illuminable panels for escalators and moving walkways. In the case of elevators, they are possibly usable for roof illuminations, but due to possible temporary optical contacts only without a protective covering.

Through the defined layer sequence of the construction comprising a plurality of layers arranged against one another could a uniform light distribution over the area dimension, which is bounded by the edge region, of the panel be achieved and a homogeneously lit side surface created. A core importance in that case attaches to the first, second, third as well as the fifth, sixth and seventh layers. The function thereof is explained in the following on the basis of the first, second and third layers, but these explanations also relate to the fifth, sixth and seventh layers.

The first layer and the third layer are glass panes which have a refractive index, which is typical for glass, of 1.45 to 2.14 (dimensionless size). The second layer, which is a transparent polymer layer, has a refractive index in the region of the 1.48 to 1.56. In the case of use of different materials it is improbable that the polymer layer has exactly the same refractive index as the two glass panes, but the two refractive indices differ only slightly from one another. This has the consequence that the light focused by scratches in the surface of the polymer plate of the fourth layer and by optical contacts between the layers is dispersed without being perceptibly resolved into spectral colors. Even observed from a small distance, the illuminated panel has by virtue of this construction a uniformly lit side surface.

If in the present specification mention is made of a uniform or homogenous light distribution over the side surface this does not mean that every region of the side surface of the illuminable transparent panel has to have exactly the same radiation output. Thus, the edge region of the side surface can by virtue of the closer position to the light source have a distinctly slightly higher light density than the center of the side surface of the illuminable panel. A uniformly or homogeneously lit side surface clearly and plainly signifies the absence of light concentrations such as visible scratches, optical contacts and clearly perceptible bright and dark spots distributed over the side surface as a consequence of superimposition of the cones of light of a plurality of light sources.

The first glass pane, the first transparent polymer layer and the second glass pane can be replaced by a composite glass pane in order to achieve the same effect. The transparent polymer layer can thus be a plastics material film or a polymer adhesive.

If the illuminable transparent panel is to be used as a glass balustrade of an escalator or a moving walkway or as a cage wall of an elevator cage, it should withstand high mechanical loading. In order to achieve this, at least the second glass layer or the third glass layer can be a hardened safety-glass pane (toughened glass or armor plate glass).

The layers of the construction have to be held together by suitable means to form an edge-illuminable transparent panel. These means can be frame profile members, which embrace the edge regions of all layers. Depending on the respective form of the panel construction, the edge regions can be bordered by U-sections, angle sections or Z-sections or the layers are fixed to a frame by means of fastening elements such as springs, screws, clips and the like. The illuminated transparent panel does not necessarily have to be bordered by a frame profile member in encircling manner. The illuminable transparent panel can also have a frame profile member in only at least one section of the edge regions, the edge regions of the layers being bordered in this section by the frame profile member.

Insofar as the light source is to be arranged in the region of a frame profile member, this can have at least one passage matched to the position and size of this at least one light source. A multiplicity of lighting bodies such as fluorescent tubes, light-emitting diodes, cold-cathode lamps and the like can be used as light source. In addition, an OLED (organic light-emitting diode) encircling the edge region of the polymer material plate is also possible. If, for example, a row of light-emitting diodes is used as light source the frame profile member can have a row of passages, in which case the pitch of the light-emitting diodes corresponds with the pitch of the passages.

An escalator or a moving walkway in most cases has side surfaces and a large under-view area, whilst an elevator cage has large cage wall surfaces and a large roof area. All these surfaces can be clad by at least one illuminable transparent panel. In order to facilitate mounting, the at least one illuminable transparent panel can be subdivided into a plurality of panel sections. Each panel section then has the construction including a plurality of layers arranged to bear against one another.

Through the construction of the panel or the panel section having a plurality of layers it is possible for gaps to be present between the individual layers even when the layers bear closely against one another or are pressed against one another by a clamping frame. The gap width of the gaps depends on the non-planarity of the side surfaces and the stiffness of the individual layers which, layered one on the other, give rise to the construction of the panel. These gaps are generally very narrow and have a high degree of capillarity. In order to prevent, for example, rainwater collecting in the gaps of the panels the gaps can be sealed in encircling manner in the edge regions of the layers by means of a sealing element. The sealing element has a joint depth of 0.2 millimeters to 20 millimeters between the layers. However, the joint depth is possibly 8 millimeters to 12 millimeters. Tightness is thereby securely provided and the sealing element can be concealed without problems by the frame profile member or by decorative strips without covering too much of the illuminable side surface of the transparent panel. The sealing element can, for example, be an adhesive foil with a sealing adhesive film, but also a layer of a hardenable paste such as silicon rubber and the like. Possibly, use is made of silicon rubber.

In order that the entry of the light emitted by the light source into the polymer material plate of the fourth layer is not obstructed the sealing element can have a cut-out matched to the light source and the fourth layer.

In order to obtain an identical optical impression from two panels or panel sections arranged adjacent to one another the light flux, which is to be introduced, of the lighting element of each panel or panel section can also be differentiated, since the individual panels or panel sections can have side surfaces and contours of different size. Possibly, an individual light source settable in light intensity and/or in color tone and/or in color saturation is therefore associated with each panel or panel section.

In addition, at least one sensor can be associated with each panel or panel section. This can be just a single sensor, which detects, as sensor signal, a digitalized image, the image regions of which can be associated with the individual panel sections by means of an image processing program. A CCD sensor, for example, is suitable as sensor. The light intensity, color tone and color saturation of the individual image regions can be compared with one another by the image processing program. Regulating data and/or regulating signals, which can be supplied to a control unit, can be calculated from this comparison. The control unit regulates the light source of the panels or panel sections with consideration of the regulating data and/or regulating signals.

However, as many sensors as panels or panel sections can also be present, these sensors possibly being arranged at suitable points in the transparent panel. Also several sensors per panel or panel section are usable. These sensors can also detect the light intensity and/or the color tone and/or the color saturation of the associated lit panel or panel section. The signal of the at least one sensor can be supplied to a control unit and processed by this.

The control unit can be a computer unit independent of the escalator or the moving walkway, but it can also be a part of a control of the escalator or the moving walkway. For example, the control unit can recognize on the basis of the sensor signal whether or not all panel sections are lit. In addition, the sensor signal can be utilized for regulation of the light intensity and/or color tone and/or color saturation of the associated panel or panel section. This makes it possible to selectably switch the panels or panel sections, to vary the color tone, color saturation and light intensity and to influence, through these lighting accents, the awareness and mood of the user. Thus, for example, aggression and anxiety can be moderated by a warm, soft lighting and the risk of vandalism reduced. The change to lighting having a less pleasant, cold or dazzling effect can have the consequence that undesired persons quickly leave the environment of, for example, the escalator or the moving walkway.

If at least two panel sections are present, one of the panel sections can be defined as master and predetermine the light intensity and/or the color tone and/or the color saturation. The remaining panel sections can be defined as servant, in which case the light intensity and/or the color tone and/or the color saturation thereof can be adapted by the control unit to the panel section defined as master. The adaptation can take place directly so that the user or observer of the escalator or moving walkway hardly perceives any difference between two panels or panel sections. The adaptation can, however, also intentionally take place with a greater delay in time so as to generate additional, dynamic light change effects. A cascade-like linking of the individual panel sections can also be present so that in the case of several panel sections the preceding panel section always serves as master for the succeeding panel section.

The first layer and/or the seventh layer can be covered at least partly by a motif film or be provided with printing, so that when the light source is switched on the motif film or the printing is backlit by the illuminable transparent panel. The imprints and motif films can, in addition, be protected by means of a further glass pane which covers these and the first or seventh layer.

The illuminable transparent panel can be used at multiple sides in an escalator or a moving walkway. An escalator or a moving walkway comprises a support structure, at least one step belt or plate belt arranged in the support structure and a respective balustrade arranged at the support structure and extending at each longitudinal side of the step belt or plate belt. The support structure has large side areas and a large under-view area. In addition, large balustrade side surfaces are present. All of these surfaces can be provided or clad with an illuminable transparent panel according to the wish of the operator. The escalator or moving walkway should have, for each illuminable transparent panel, at least one light source which is arranged in the edge region of the illuminable transparent panel.

The illuminable transparent panel of one balustrade or both balustrades can by its illuminable side surfaces provide excellent illumination of the region of the step belt or plate belt. Due to the large-area distribution of the light over the side surface of the illuminable transparent panel the users are not dazzled.

As mentioned further above, the elevator cage of an elevator can also be equipped with illuminable transparent panels. The elevator cage usually comprises a cage frame. Cage walls, optionally a cage door, a cage floor and a cage roof are fastened to the cage frame. Each of these parts can be constructed as an illuminable transparent panel. The illuminable panels possibly extend over the entire area of the cage walls, in a given case the cage door, cage floor and/or cage roof. An elevator cage provided with illuminable transparent panels can have at least one light source which is arranged at at least one edge region of the at least illuminable transparent panel.

BRIEF DESCRIPTION OF THE DRAWINGS

The disclosure refers to the following drawings, in which.

DETAILED DESCRIPTION

Figure 1:
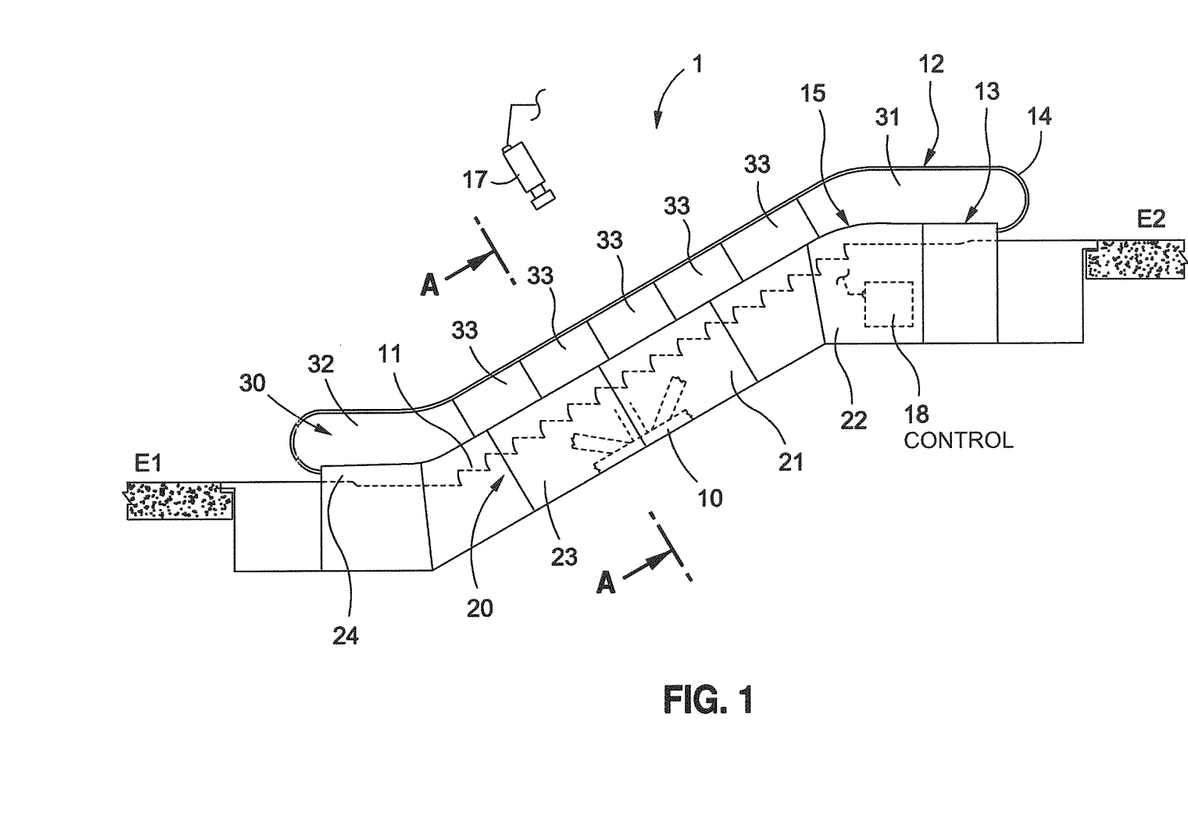
FIG. 1 shows, schematically, in plan view an escalator with a support structure and with balustrades, which have illuminable transparent panels.

An escalator 1 with a support structure 10 is illustrated schematically in FIG. 1 in plan view. The escalator 1 connects a lower plane E1 with an upper plane E2. Arranged in the support structure 10 is a circulating step belt 11 which is deflected in the upper plane E2 and in the lower plane E1 and thus has a forward running section and a return running section. For the sake of better clarity, illustration of the return running section was dispensed with, as well as illustration of frames, guide rails, rail blocks and a drive unit. The escalator 1 further comprises two balustrades 12 which extend along each longitudinal side of the step belt 11, wherein in FIG. 1 only the balustrade 12 disposed at the front in the viewing plane is visible. A handrail 14 is arranged at each balustrade 12 to circulate, wherein the return running section thereof is arranged in a balustrade base 13 which connects the balustrade 12 with the support structure 10. Insofar as the support structure 10 and the arranged components therein are to be visible, the side walls of the support structure 10 can be clad by at least one illuminable transparent panel 20, wherein this is subdivided into a plurality of panel sections 21, 22, 23 and 24. The panel sections 21, 22, 23 and 24 extend in height over the support structure 10 and the balustrade base 13.

In addition, a possible advantage of the construction of the illuminable transparent panels is shown in FIG. 1. The illuminable transparent panels can have in the area dimension thereof, by which is meant the profile of the side surface thereof, almost all conceivable forms. In the exemplifying embodiment of FIG. 1 a first panel section 21 of the illuminable transparent panel 20 has a rectangular side surface and the side surface of a second panel section 22 is matched to the profiles, which are to be clad, by a transition radius 15 and the balustrade base 13 running out. The support structure 10 and the balustrade base 13 can, alternatively to the illuminated transparent panel 20, also be paneled or clad with conventional opaque panels.

The balustrade 12 can also have at least one illuminable transparent panel 30. This illuminable transparent panel 30 is also subdivided into a plurality of panel sections 31, 32 and 33. In order to keep production costs as low as possible, the illuminable transparent panel 30 comprises a plurality of middle panel sections 33, the rectangular side surfaces of which have identical dimensions in length and height. An upper panel section 31 and a lower panel section 32 are adapted in the area extent thereof to the profile of the balustrade 12 in these regions and to the respectively adjoining middle panel section 33.

As described in the foregoing, an escalator 1 or moving walkway 1 can comprise a plurality of illuminable panels 20, 30 or panel sections 21, 22, 23, 24, 31, 32, 33. In order to achieve homogenous illumination at all panels 20, 30 or panel sections 21, 22, 23, 24, 31, 32, 33 a predetermined region of the escalator 1 or the moving walkway 1 can be monitored by means of at least one imaging sensor 17. In the present example, a schematically illustrated video camera serves as sensor 17, the signals or data of which can be transmitted to the control 18 of the escalator 1. The image sequences of the sensor 11 can be analyzed continuously or in discrete steps in the control 18 by means of an image processing program. If the light intensity and/or the color tone and/or the color saturation of a panel or panel section differs from the others, the light source (not illustrated) of this panel 20, 30 or panel section 21, 22, 23, 24, 31, 32, 33 can be adjusted.

In order to enhance clarity, the signal lines between the sensor 17 and the control 18 were illustrated in interrupted form. Wire-free communications devices can also be used instead of these signal lines. The control and regulation of the light intensity and/or the color tone and/or the color saturation makes it possible to selectably switch the panels 20, 30 or, if present, the panel sections 21, 22, 23, 24, 31, 32, 33, in accordance with the intentions of the operator of an escalator 1 or a moving walkway 1, to vary the color tone, color saturation and light intensity and, through these lighting accents, to influence the awareness and mood of the user.

Figure 2:
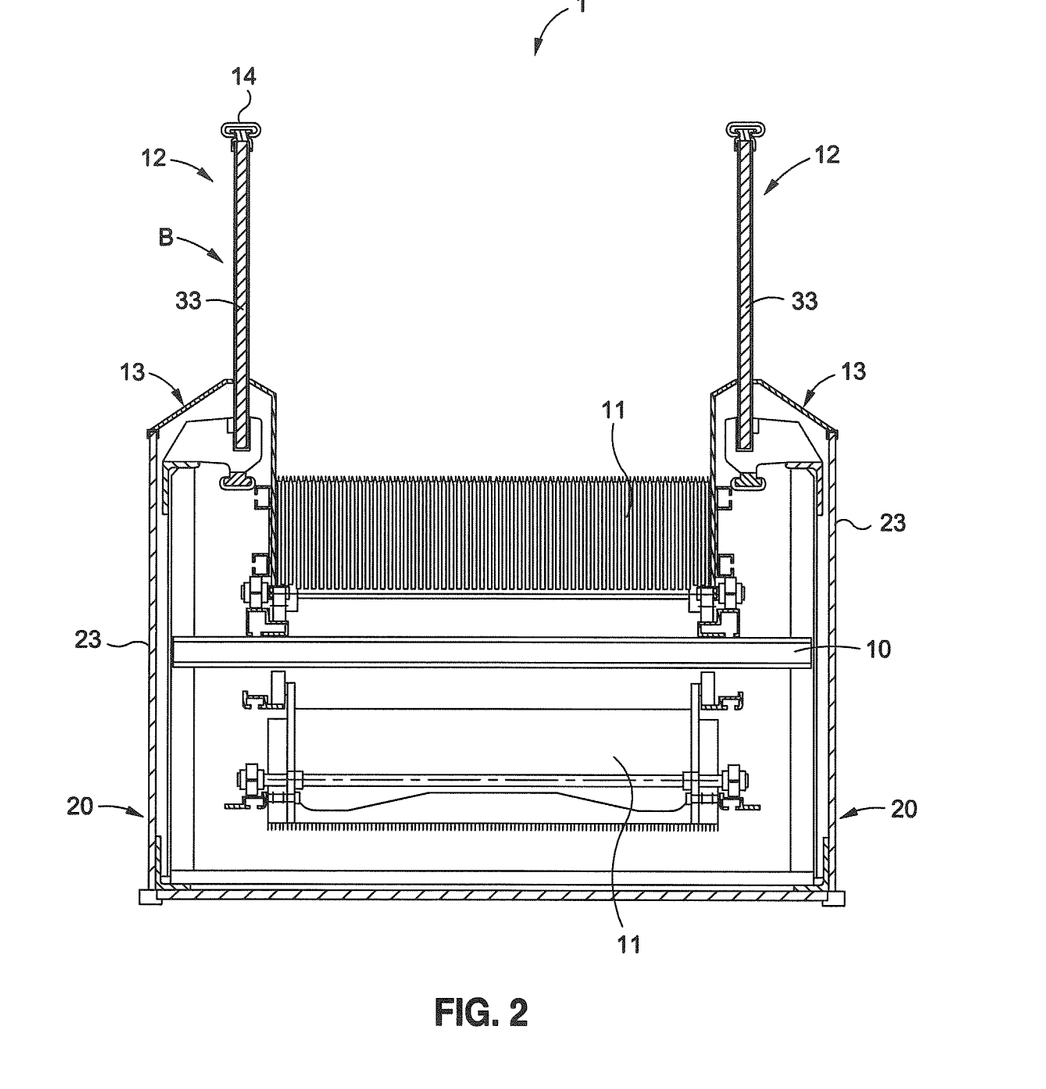
FIG. 2 shows the escalator of FIG. 1 in the cross-section A-A.

FIG. 2 shows the cross-section A-A, which is indicated in FIG. 1, of the escalator 1. Correspondingly, all reference numerals are the same as in FIG. 1. This also applies to FIGS. 3 and 4. In FIG. 2 the arrangement of the step belt 11 in the support structure 10 and the two balustrades 12, which are connected with the support structure by means of a balustrade base 13, can be readily seen. The construction of the illuminable transparent panel sections 33, which are arranged in the section A-A, of the balustrades 12 is illustrated in detail in FIGS. 3 and 4. In addition, the guidance of the handrail 14 at the upper edge region of the balustrades 12 and in the balustrade base 13 is apparent.

The escalator 1 is clad on both sides with illuminable transparent panels 20. The third panel sections 23, which are arranged in the section A-A, of the illuminable transparent panels 20 are fastened to the support structure 10. The construction of the illuminable transparent panel sections 23 substantially corresponds with the construction of the illuminable transparent panel sections 33 of the balustrades 12, in which case the thicknesses of the layers of the panel sections 23 can differ from the thicknesses of the layers of the panel sections 33. In the case of panels with specially adapted profiles a particular arrangement of one or more light sources in a given case can be based on tests in order to produce a light distribution, which is as uniform as possible, over the entire side surface of the illuminable panel 20, 30 or of the panel section 23, 33.

Figure 3:
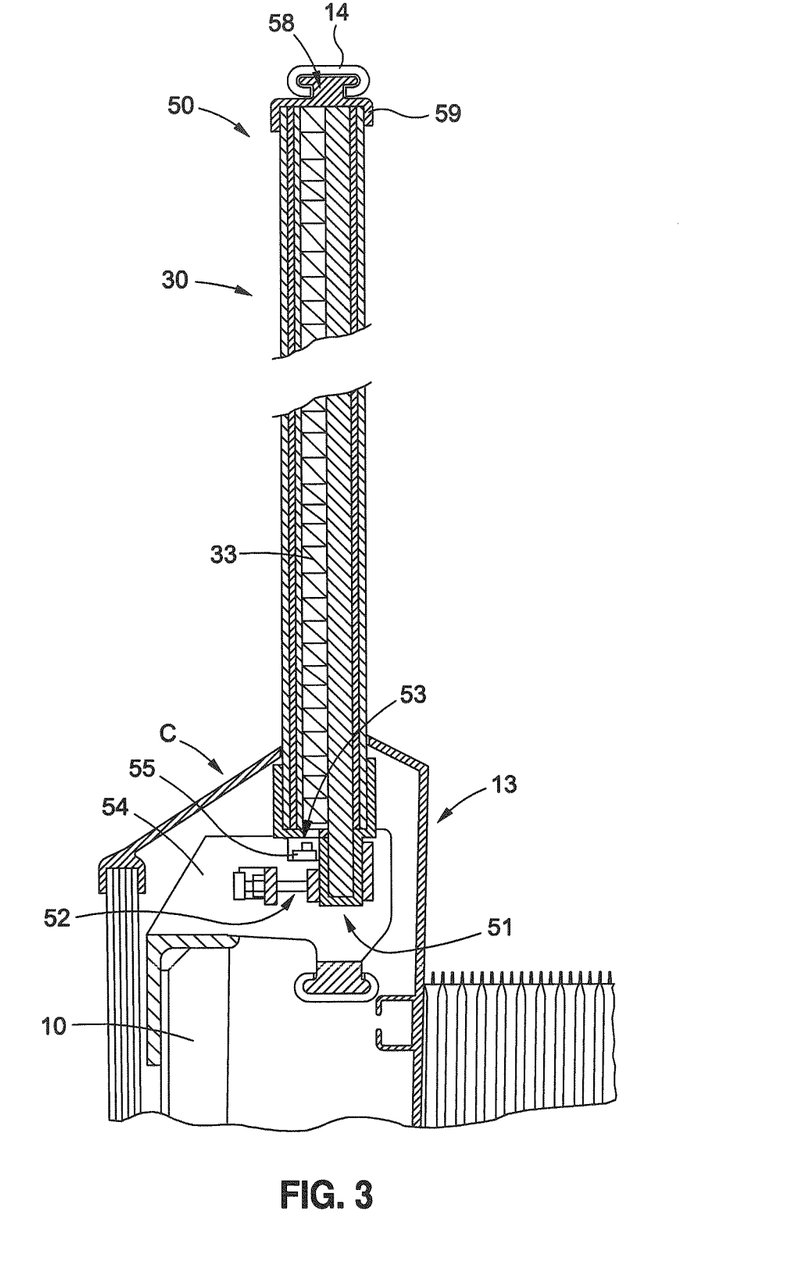
FIG. 3 shows a detail view of the detail B indicated in FIG. 2, in which the construction of the illuminable transparent panel of the balustrade and the fastening thereof to the support structure is illustrated.

FIG. 3 illustrates a detail view of the detail B indicated in FIG. 2, which shows the construction of the panel section 33 or of the illuminable transparent panel 30. This is gripped at its lower edge section 51 in a fastening flange 54 of the balustrade base 13 and firmly clamped by means of clamping elements 52. The fastening flange 54 is fixedly connected with the support structure 10. The fastening flange 54 has a section 53 in which the light source 55 for illumination of the panel section 33 is arranged. The illustrated fastening of the panel section 33 by means of a fastening flange 54 is only one of numerous possibilities.

The light source 55 is illustrated by way of example as a chain of light-emitting diodes, but use can be made of any form of light sources 55 such as, for example, fluorescent tubes, cold cathode tubes, incandescent lamps, organic light-emitting diodes and the like. The light source 55 can, however, also be fastened directly to the illuminable transparent panel 30 or to the illuminable transparent panel section 33.

As described further above, the handrail 14 is guided in the upper edge section 50 of the illuminable transparent panel 30 or panel section 33. The guide 58 of the handrail 14 is constructed at a frame profile member 59, which extends orthogonally to the section plane along the upper edge section 50 of the panel section 33. The frame profile member 59 moreover bounds all upper edge regions of the construction, which comprises a plurality of layers, of the panel section 33.

Figure 4:
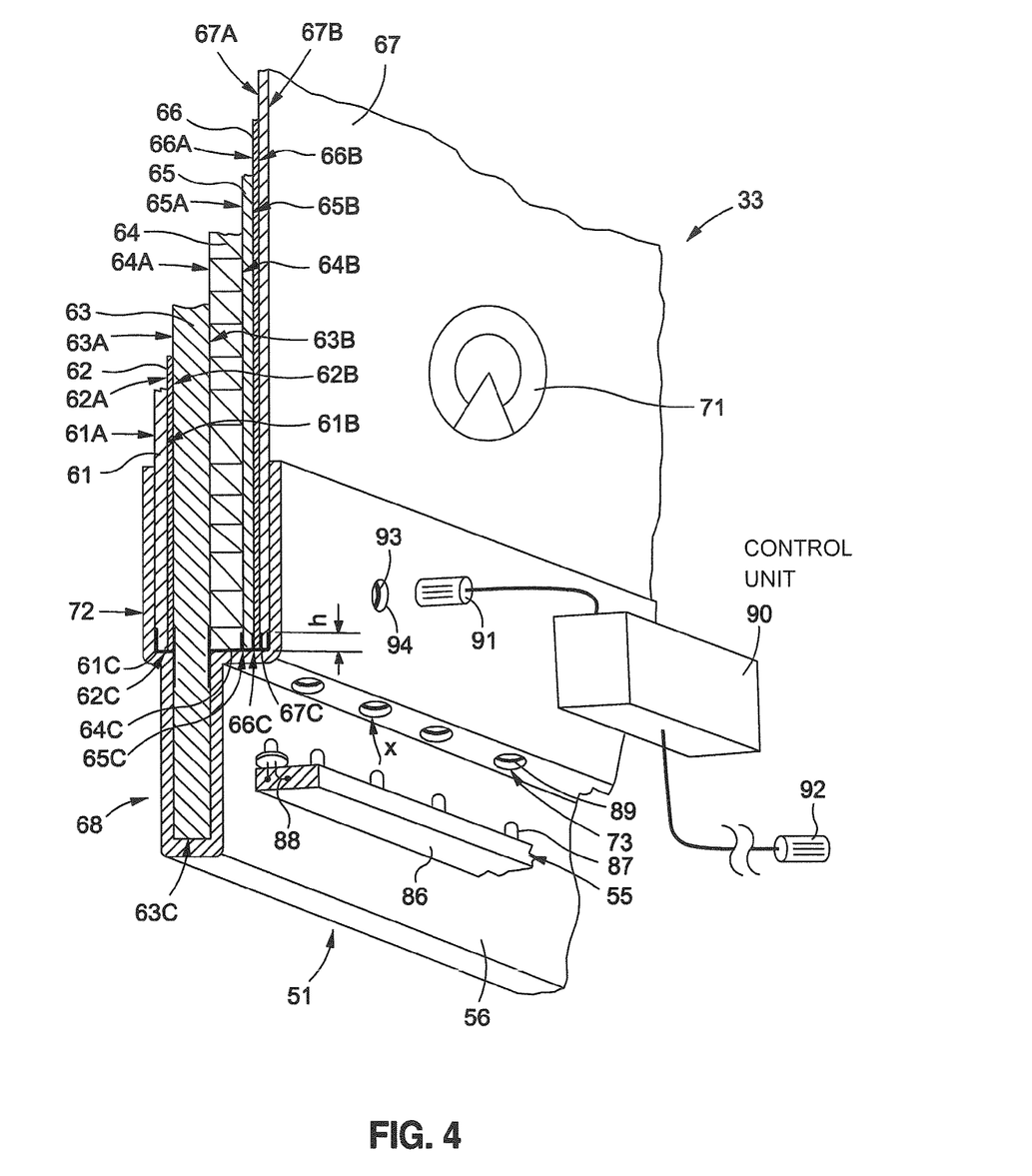
FIG. 4 shows, in three-dimensional view to enlarged scale, a detail of the illuminable transparent panel of the balustrade of FIG. 3 from the viewing direction C indicated in FIG. 3.

This construction, which comprises a plurality of layers, of the panel section 33 is shown by FIG. 4 as a three-dimensional, enlarged detail view from the viewing direction C, as is indicated in FIG. 3. All illuminable transparent panels of FIGS. 1 to 4 have substantially the same layer sequence of construction as the panel section 33 illustrated in FIG. 4. A first layer of the construction is a first transparent glass pane 61. A second layer is a first transparent polymer layer 62 and a third layer is a second transparent glass pane 63. Lying against this as a fourth layer is a polymer material plate 64 containing light-dispersing particles, such as is marketed by, for example, the company Röhm under the product name 'Plexiglass EndLighten'. A fifth layer is a third transparent glass pane 65, a sixth layer is a second transparent polymer layer 66 and a seventh layer is a fourth transparent glass pane 67. The fifth, sixth and seventh layers 65, 66, 67 can also be fixedly connected together, for example as a composite glass pane. The glass pane 63 of the third layer is, in the present embodiment, a hardened safety glass pane. Possibly, as illustrated in FIG. 3, the armor plate of the third layer 63 in the layer sequence of the construction is arranged closer to the step belt than the polymer material plate 64, which contains the light-dispersing particles, of the fourth layer. This can mean that less light can pass in the direction of the step belt, whereby there is additional avoidance of the possibility of the users being dazzled. In a given case use can be made, instead of the armor plate 63, of a glass pane 63 of the same thickness as the glass panes 61, 65 and 67 of the first, fifth and seventh layers. In addition, the second glass pane 63 of the third layer can be realized together with the first glass pane 61 and the first transparent polymer layer 62 as a composite glass pane.

Each layer has two mutually opposite side surfaces 61A, 61B, 62A, 62B, 63A, 63B, 64A, 64B, 65A, 65B, 66A, 67A, 67B, the area extent of which is bounded by an edge region 610, 62C, 63C, 64C, 65C, 66, 67C. The edge regions 610, 62C, 64C, 65C, 66, 67C of the first, second and fourth to seventh layers are congruent in the present example. The area dimension of the second glass pane 63 of the third layer is dimensioned to be somewhat larger, so that this has, as illustrated in FIGS. 3 and 4, a projection 68 in the lower edge section 51. The projection 68 serves for fastening the illuminable transparent panel section 33 to the fastening flange (not illustrated). Other modes of fastening can also be used if these impart sufficient strength to the connection between balustrade and balustrade base. The lower edge section 51 of the illuminable transparent panel section 33 has a frame profile member 56 over its length, by which the edge regions 61C, 62C, 63C 64C, 65C, 66C, 67C of all layers are gripped.

The light source 55 is arranged below the transparent illuminable panel 33 or the frame profile member 56 (with the exception of the projection 68). This comprises a strip-shaped flexible base body 86, which is provided with conductor paths 88 and on the upper side of which light-emitting diodes 87 are arranged. Light-emitting diodes 87 settable in light intensity and/or in color tone and/or in color saturation are possibly arranged.

In order that the light, which is emitted by the light-emitting diodes 87 and which is illustrated by the arrow X, can pass into the light-dispersing polymer material plate 62 of the fourth layer the frame profile member 56 has passages 89 matched to the position and size of the light-emitting diodes 87. In concrete terms this means that in the present example the pitch of the passages 89 corresponds with the pitch of the light-emitting diodes 87 on the base body 86. In addition, the diameter of the individual passages 89 can be dimensioned to be of such a size that as far as possible all emitted light can be fed into the polymer material plate 64. The light-dispersing particles embedded in the polymer material plate 64 of the fourth layer now deflect the light fed into the edge region 64C thereof so that this light issues at the side surfaces 64A, 64B from the fourth layer and penetrates through the third, second and first layers 63, 62 and 61 or through the fifth, sixth and seventh layers 65, 66 and 67. The light issues from the side surface 61A of the first glass pane 61 of the first layer or the side surface 67A of the fourth glass pane 67 of the seventh layer into the environment of the escalator or the moving walkway. In addition, by virtue of the transparent characteristics of the transparent panel or panel section 33 the visible light, for example, daylight, can also penetrate all layers of the construction.

The four glass panes 61, 63, 65, 67 of the first, third, fifth and seventh layers have a refractive index 1.45 to 2.14 (dimensionless size) typical for glass. The transparent polymer layers 62, 66 of the second and sixth layers have a refractive index in the region of 1.48 to 1.56. In the case of use of the different materials it is unlikely that the polymer layers 62, 66 have exactly the same refractive index as the four glass panes 61, 63, 65 and 67, but these differ only slightly from one another. This has the consequence that the light focused by scratches in the surface of the polymer plate 64 of the fourth layer as well as by optical contacts between the layers is dispersed without being perceptibly broken down into the spectral colors of visible light. Even considered from a small distance, the illuminated transparent panel section 33 has by virtue of this construction a uniformly lit side surface 61A of the first transparent glass pane 61 and a uniformly lit side surface 67B of the fourth transparent glass pane 67. Correspondingly, each illuminable transparent panel containing this construction has such uniformly lit side surfaces at both sides. The side surfaces 61A, 67B of the first and seventh layers can, in addition, be covered by a motif film 71 or be provided with printing.

Through the construction, which comprises a plurality of layers 61, 62, 63, 64, 65, 66 and 67, of the panel section 33 gaps between the individual layers can be present, even when the layers 61, 62, 63, 64, 65, 66 and 67 bear tightly against one another. The gap width of the gaps depends on the non-planarity of the side surfaces 61B, 62A, 62B, 63A, 63B, 64A, 64B, 65A, 65B, 66A, 66B and 67A and stiffness of the individual layers 61, 62, 63, 64, 65, 66 and 67, which—layered one on the other—provide the construction of the panel section 33. These gaps are generally very narrow and have a high level of capillarity. In order to prevent, for example, rainwater collecting in the gaps of the illuminable panels the gaps in the present embodiment are sealed off all round in the edge regions 61C, 62C, 64C, 65C, 66C and 67C of the layers 61, 62, 64, 65, 66 and 67 by means of a sealing element 72. The sealing element 72 has a joint depth h of 0.2 millimeters to 20 millimeters between the layers 61, 62, 63, 64, 65, 66 and 67. The joint depth is, however, possibly 8 millimeters to 12 millimeters. Tightness is thereby securely imparted and the sealing element 72 can be concealed without problems by the frame profile member 56 or by decorative strips without covering too much of the illuminable side surfaces 61A, 67B of the panel section 33. Transparent silicon rubber is possibly used as the sealing element 72. In order that entry of light emitted by the light source 55 into the polymer material plate 64 of the fourth layer is not obstructed the sealing element 72 has cut-outs 73 matched to the light source 55 and the passages 66.

As shown in FIGS. 1 to 4, an escalator 1 or a moving walkway 1 can comprise a plurality of illuminable transparent panels 20, 30 or transparent panel sections 21, 22, 23, 24, 31, 32, 33. At least one sensor 91, 92 can be associated with each illuminable transparent panel 20, 30 or transparent panel section 21, 22, 23, 24, 31, 32 and 33, as is schematically illustrated in the embodiment of FIG. 4. The sensor 91 of the transparent panel section 33 is arranged in the lower edge section 51 thereof. In order that it can detect the light intensity and/or the color tone and/or the color saturation of the illuminated transparent panel section 33 the frame profile member 56 has a hole 93. This hole 93 cannot be seen by a user of the escalator or the moving walkway who views the side surface 61A of the first layer 61, because this is covered by the frame profile member 56. The hole 93 is possibly similarly provided with a seal 94 so that no liquids can penetrate between the frame profile member 56 and the fourth glass pane 67 of the seventh layer. The signal of the sensor 91 is fed to a control unit 90 and can be processed by this.

FIG. 4 additionally shows a further sensor 92 which is associated with an illuminable transparent panel or panel section (not illustrated), for example the illuminable transparent panel 20 illustrated in FIG. 1, with which the support structure is clad. The control unit 90 can now recognize, by way of the sensor signals of the sensors 91, 92, whether or not all illuminable panels are illuminated. In addition, the sensor signal can be utilized for regulation of the light intensity and/or the color tone and/or color saturation of the associated panel. This makes it possible to selectably switch the panels or, if present, the panel sections in accordance with the requirements of the operator of an escalator or a moving walkway, to vary or adapt the color tone, color saturation and light intensity and to influence, by these light accents, the awareness and mood of the user.

Figure 5:
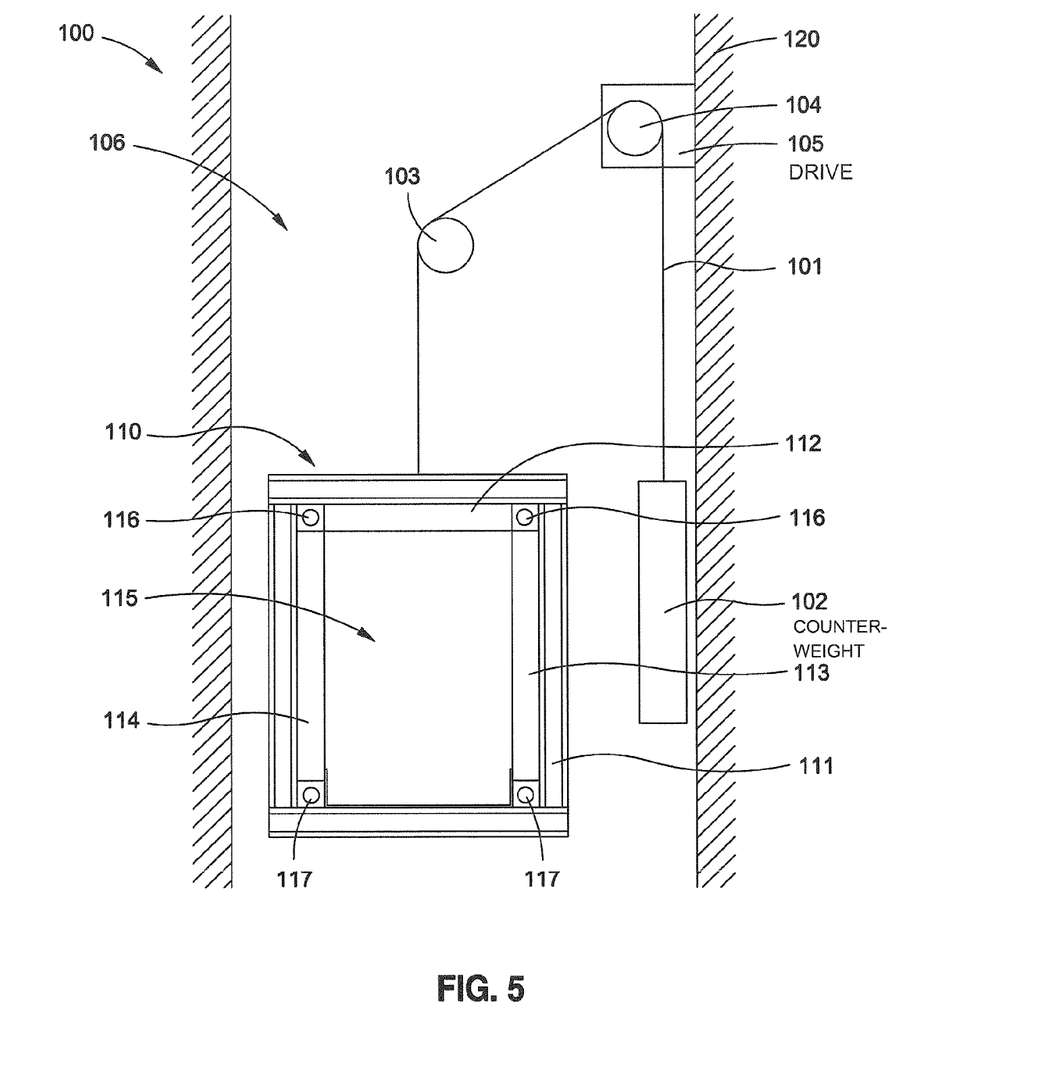
FIG. 5 shows, schematically and in sectional plan view, an elevator with an elevator cage, the cage walls and cage roof of which are illuminable transparent panels.

FIG. 5 shows schematically and in sectional plan view an elevator 100 with an elevator cage 110. The elevator cage 110 is connected with a counterweight 102 by a support means 101. The support means 101 is guided by way of a deflecting pulley 103 and a drive pulley 104. The drive pulley 104 is connected with a drive 105. The elevator cage 110, support means 101, counterweight 102, deflecting pulley 103, drive pulley 104 and drive 105 are arranged in an elevator shaft 106. The elevator cage 110 has a cage frame 111. Illuminable transparent panels serving as cage roof 112 and cage walls 113 and 114 are fastened to the cage frame 111. The light-emitting side surfaces thereof are oriented towards the interior space 115 of the elevator cage 110 and towards the shaft walls 120. The elevator cage 110 can also be arranged, instead of in an elevator shaft, at a façade of a building so that at least a part of the light-emitting side surfaces, which are remote from the interior space 115, of the cage walls are directed towards the environment of the building. Light sources 116 and 117 are arranged in the corner regions of the cage frame 111. The upper light sources 116 arranged in the corner regions of the cage roof 112 feed their issuing light at the edge not only into the illuminable transparent panel of the cage roof 112, but also into the adjoining cage walls 113 and 114. The light sources 116 and 117 can possibly be varied in light intensity and/or color tone and/or color saturation. The illuminable transparent panel can thereby also be used as a passenger information system. If, for example, any story of a parking building is painted in an individual color, the color tone of the light source can be matched to the color of the respective story so that it is made known to the user at all times on exactly which story he or she is located.

Although the disclosed technology has been described by illustration of specific embodiments on the basis of an escalator and an elevator it can also be used in a moving walkway and numerous further variants of embodiment can be created with knowledge of the present disclosure. Thus, light can be supplied only into one edge section of the edge region of the polymer material plate. However, the light is possibly supplied to two mutually opposite edge sections. Light sources can be arranged to encircle the entire edge region of the polymer material plate and to supply light. In addition, already existing escalators and moving walkways can be subsequently equipped or modernized with illuminable transparent panels.

In addition, not every surface of a moving walkway or an escalator has to be provided with an illuminable transparent panel. The transparent illuminable panel or panel section also does not have to span the entire available area. Thus, for example, the illuminable part of a side wall of the support structure or a balustrade can extend to only half the height thereof.

The illuminable transparent panel not only can serve for optical enhancement of an escalator or moving walkway, but also can be used for signaling operating states. For example, the illuminable transparent panels can indicate the running direction of the step belt or plate belt, in which case, for example, the departure zone is lit by red and the access zone by green. Escalators taken out of operation could be lit with a different color, for example blue, whilst balustrades of escalators and moving walkways shut down due to maintenance operations could flash yellow.

Moreover, the illuminable transparent panels can also have further transparent or semi-transparent layers between the afore-described layers. The enlarged layer sequence of these illuminable transparent panels corresponds with the claimed construction notwithstanding the added layers, for which reason these are also embraced by the scope of protection. However, each additional layer reduces the light output of the illuminable transparent panel and reduces its permeability to visible light over its entire thickness.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. An illuminable transparent panel for illumination by at least one light source arranged at an edge region of the panel, comprising a plurality of layers each having opposed side surfaces with the side surfaces of adjacent layers being in contact with each other and an edge region, the layer edge regions forming said panel edge region, the layers comprising:
   a first layer comprising a first glass pane;
   a second layer adjacent to the first layer, the second layer comprising a first transparent polymer layer;
   a third layer adjacent to the second layer, the third layer comprising a second glass pane;
   a fourth layer adjacent to the third layer, the fourth layer comprising a transparent edge-illuminable polymer material plate;
   a fifth layer adjacent to the fourth layer, the fifth layer comprising a third glass pane;
   a sixth layer adjacent to the fifth layer, the sixth layer comprising a second transparent polymer layer; and
   a seventh layer adjacent to the sixth layer, the seventh layer comprising a fourth glass pane.

2. The illuminable transparent panel of claim 1, the first glass pane, the transparent polymer layer, and the second glass pane forming a composite glass pane.

3. The illuminable transparent panel of claim 1, the third glass pane, the second transparent polymer layer, and the fourth glass pane forming a composite glass pane.

4. The illuminable transparent panel of claim 1, the second glass pane or the third glass pane comprising a hardened safety glass pane.

5. The illuminable transparent panel of claim 1, further comprising a frame profile member, at least one of the edge regions of the first, second, third, fourth, fifth, sixth or seventh layers being arranged against the frame profile member.

6. The illuminable transparent panel of claim 1, further comprising a frame profile member, the frame profile member encircling the edge regions of the first through seventh layers.

7. The illuminable transparent panel of claim 6, the frame profile member comprising a light source passage.

8. The illuminable transparent panel of claim 1, the illuminable transparent panel being positioned adjacent to an additional illuminable transparent panel.

9. The illuminable transparent panel of claim 1, further comprising a seal for an inter-layer gap, the gap seal having a joint depth between 0.2 millimeters and 20 millimeters.

10. The illuminable transparent panel of claim 9, the gap seal having a joint depth between 8 millimeters and 12 millimeters.

11. The illuminable transparent panel of claim 9, the seal comprising a cut-out for a light source and for the fourth layer.

12. The illuminable transparent panel of claim 1, further comprising a light source, the light source having a settable light intensity, a settable color tone, or a settable color saturation.

13. The illuminable transparent panel of claim 12, further comprising a sensor, the sensor being configured to detect a light intensity, a color tone, or a color saturation of the panel and to send a sensor signal to a control unit.

14. The illuminable transparent panel of claim 13, the panel being adjacent to an additional panel, the panel being a master panel and the additional panel being a servant panel, a light setting of the servant panel being based by the control unit on a light setting of the master panel.

15. The illuminable transparent panel of claim 1, further comprising a motif film or printing on the first layer or the seventh layer, the motif film or the printing being backlit when the panel is illuminated.

16. An escalator or moving walkway, comprising:
   a support structure;
   a step belt or plate belt arranged in the support structure;
   an illuminable transparent panel arranged at the support structure and extending along a longitudinal side of the step belt or of the plate belt, the illuminable transparent panel comprising
a first layer, the first layer having a first set of opposing sides and being bounded by a first edge region, the first layer comprising a first glass pane, a second layer, the second layer having a second set of opposing sides and being bounded by a second edge region, the second layer being adjacent to the first layer, the second layer comprising a first transparent polymer layer,
a third layer, the third layer having a third set of opposing sides and being bounded by a third edge region, the third layer being adjacent to the second layer, the third layer comprising a second glass pane, a fourth layer, the fourth layer having a fourth set of opposing sides and being bounded by a fourth edge region, the fourth layer being adjacent to the third layer, the fourth layer comprising a transparent edge-illuminable polymer material plate, a fifth layer, the fifth layer having a fifth set of opposing sides and being bounded by a fifth edge region, the fifth layer being adjacent to the fourth layer, the fifth layer comprising a third glass pane, a sixth layer, the sixth layer having a sixth set of opposing sides and being bounded by a sixth edge region, the sixth layer being adjacent to the fifth layer, the sixth layer comprising a second transparent polymer layer, and a seventh layer, the seventh layer having a seventh set of opposing sides and being bounded by a seventh edge region, the seventh layer being adjacent to the sixth layer, the seventh layer comprising a fourth glass pane; and
   a light source arranged at an edge of the illuminable transparent panel.

17. An elevator cage, comprising:
   a cage frame;
   a cage floor connected to the cage frame;
   an illuminable transparent panel connected to the cage frame, the illuminable transparent panel comprising, a first layer, the first layer having a first set of opposing sides and being bounded by a first edge region, the first layer comprising a first glass pane, a second layer, the second layer having a second set of opposing sides and being bounded by a second edge region, the second layer being adjacent to the first layer, the second layer comprising a first transparent polymer layer, a third layer, the third layer having a third set of opposing sides and being bounded by a third edge region, the third layer being adjacent to the second layer, the third layer comprising a second glass pane, a fourth layer, the fourth layer having a fourth set of opposing sides and being bounded by a fourth edge region, the fourth layer being adjacent to the third layer, the fourth layer comprising a transparent edge-illuminable polymer material plate,
a fifth layer, the fifth layer having a fifth set of opposing sides and being bounded by a fifth edge region, the fifth layer being adjacent to the fourth layer, the fifth layer comprising a third glass pane, a sixth layer, the sixth layer having a sixth set of opposing sides and being bounded by a sixth edge region, the sixth layer being adjacent to the fifth layer, the sixth layer comprising a second transparent polymer layer, and a seventh layer, the seventh layer having a seventh set of opposing sides and being bounded by a seventh edge region, the seventh layer being adjacent to the sixth layer, the seventh layer comprising a fourth glass pane; and
   a light source arranged at an edge of the illuminable transparent panel.

* * * * *